Feb. 23, 1926.
J. T. LEMON
CONVEYING APPARATUS
Filed June 25, 1924   2 Sheets-Sheet 1
1,574,430
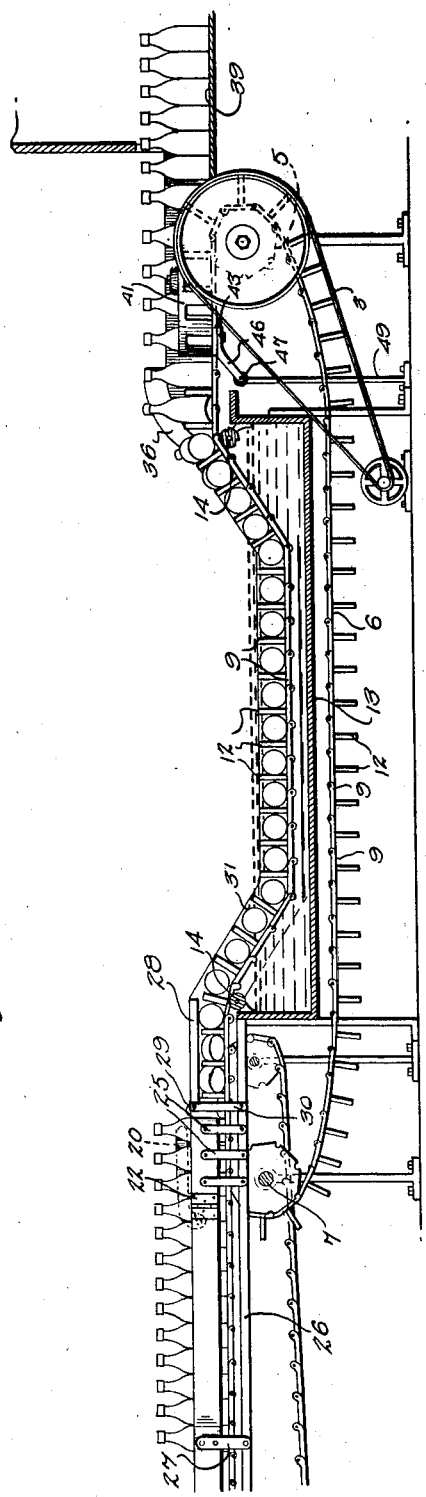
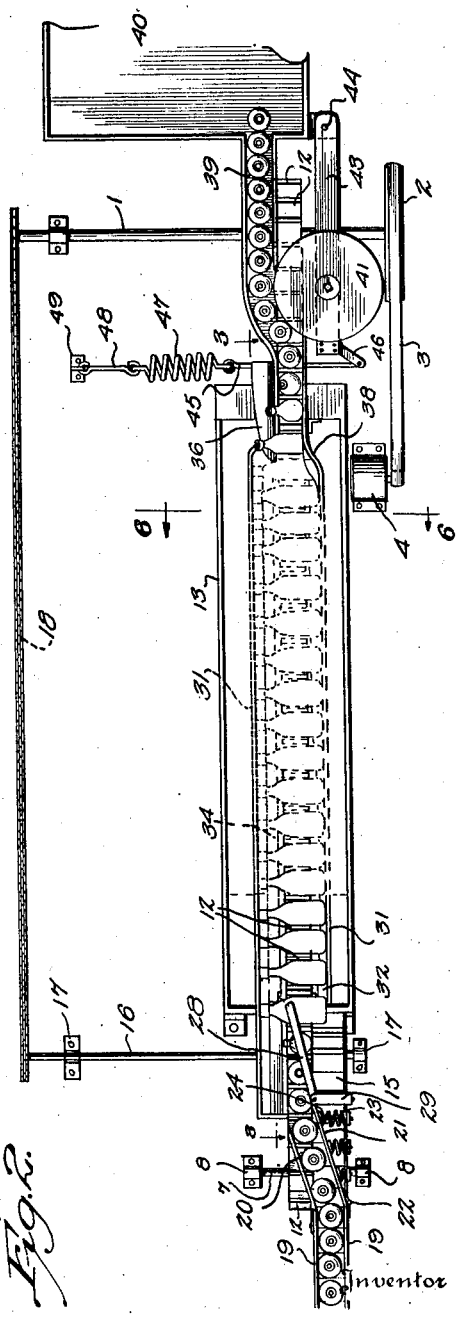
Inventor
JOHN T. LEMON
By C. H. Parker
Attorney Feb. 23, 1926.  1,574,430
J. T. LEMON
CONVEYING APPARATUS
Filed June 25, 1924    2 Sheets-Sheet 2
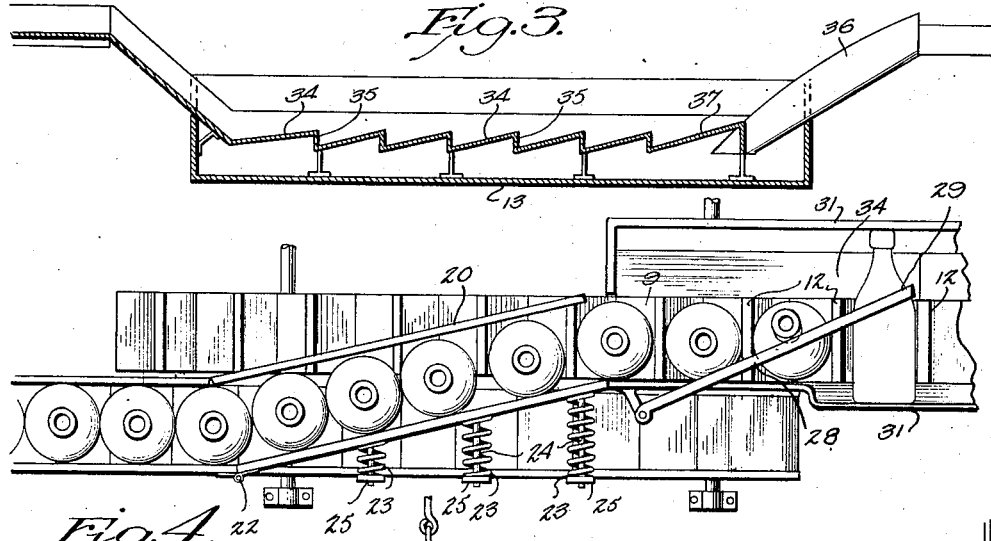
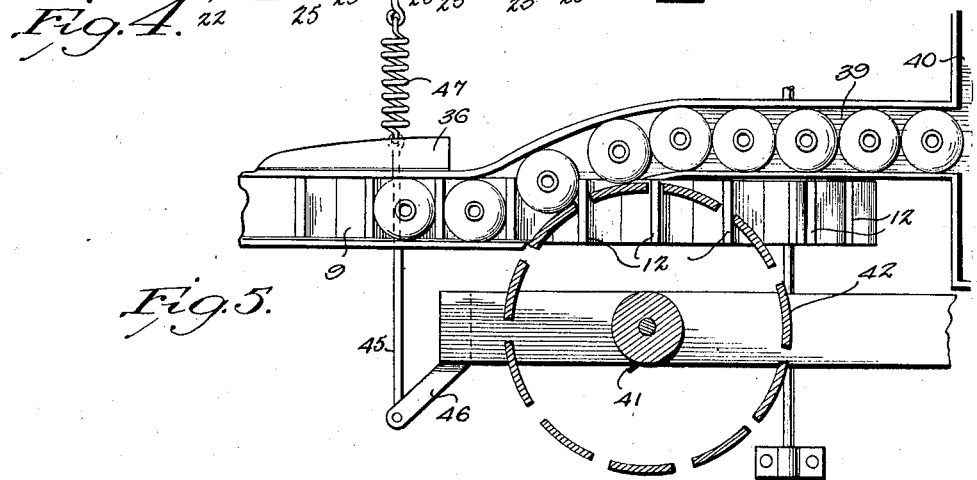
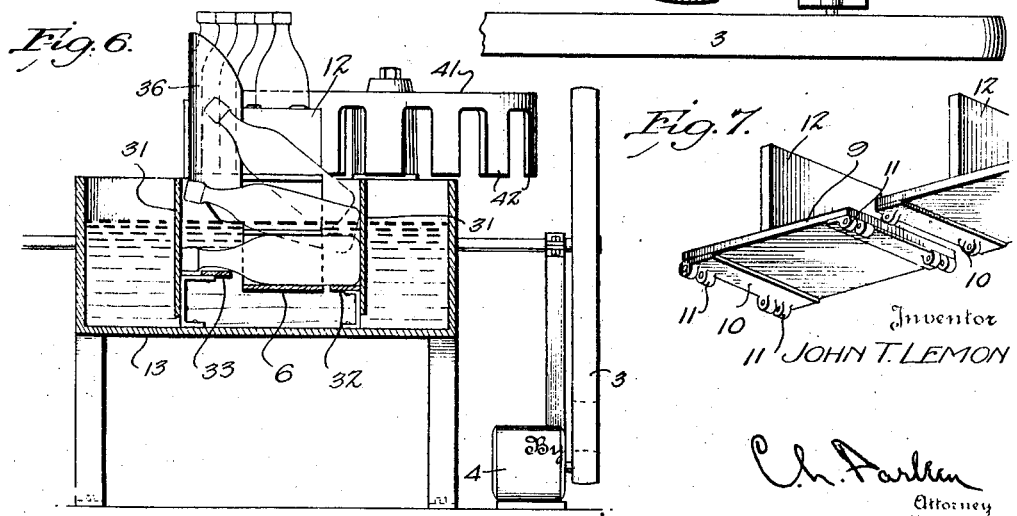
Inventor
JOHN T. LEMON Patented Feb. 23, 1926.

1,574,430

UNITED STATES PATENT OFFICE.

JOHN T. LEMON, OF COLUMBUS, OHIO.

CONVEYING APPARATUS.

Application filed June 25, 1924. Serial No. 722,365.

*To all whom it may concern:*

Be it known that I, JOHN T. LEMON, a citizen of the United States, residing at Columbus, in the county of Franklin and State of Ohio, have invented certain new and useful Improvements in Conveying Apparatus, of which the following is a specification.

This invention relates to conveying apparatus, and more particularly to an apparatus for delivering bottles, or the like, through a washing tank.

This application is a continuation in part of my copending application filed June 15th, 1923, Serial No. 645,605.

In the present invention, I provide a conveyor adapted to receive bottles in a vertical position, lower them to a horizontal position, and pass them through a washing tank, restore them to a vertical position and then deliver them to a loading table.

An object of the invention is to provide means for transferring bottles from one conveyor to another.

A further object is the provision of means for lowering the bottles from a vertical to a horizontal position.

A further object is the provision of means for raising the bottles from a horizontal position to a vertical position after they have passed through the washing tank.

A further object of the invention is the provision of means for unloading the bottles from the conveyor.

In the accompanying drawings, I have shown one embodiment of the invention. In this showing:

Figure 1 is a side elevation of the conveying apparatus, the washing tank being shown in section, Figure 2 is a plan view, Figure 3 is a vertical sectional view on line 3—3 of Figure 2, Figure 4 is a detail plan view on an enlarged scale showing the means for transferring bottles from one conveyor to another and lowering them from a vertical position to a horizontal position, Figure 5 is a horizontal sectional view of the unloading apparatus, Figure 6 is a vertical sectional view on line 6—6 of Figure 2, and, Figure 7 is a detail view of a pair of conveyor members.

Referring to the drawings, the reference numeral 1 designates a main drive shaft which is provided with a pulley 2 adapted to receive a belt 3 connected to a pulley on a motor shaft 4. The motor 4 is shown for convenience of illustration and it is to be understood that any type of prime mover may be substituted therefor. The shaft 1 is provided with a sprocket wheel 5, adapted to receive a main conveyor 6. The other end of the conveyor passes over a sprocket (not shown) on an idler shaft 7, which may be mounted in suitable bearings 8. The conveyor is formed of a plurality of flights shown in detail in Figure 7 of the drawings. As shown, each flight consists of a base 9 having plates 10 arranged on each end, and these plates are provided with sleeves 11 adapted to receive pins by means of which the conveyor flights are connected to each other. The sleeves also serve as driving connections between the conveyor and the sprocket wheel 5. A vertical member 12 is secured to each of the base sections of the conveyor, forming a plurality of compartments, each of which is adapted to receive a bottle. A washing tank 13 is arranged in the path of the conveyor and as shown, the conveyor chain is adapted to pass through the tank on its operative flight. On the return flight of the conveyor, it passes beneath the washing tank as shown in Figure 1 of the drawings. A guide roll 14 may be arranged at each end of the tank to facilitate the movement of the conveyor into and out of the tank.

The bottles are delivered to the main conveyor by an auxiliary conveyor 15. This auxiliary conveyor is driven from a shaft 16 which is mounted in suitable bearings 17 and is provided with a sprocket (not shown) adapted to mesh with the links of the conveyor chain. The auxiliary conveyor is formed of hinged connected plates, similar to the main conveyor but is not provided with the vertical partition members 12. The shafts 1 and 16 are provided with sprocket wheels adapted to receive a chain 18 to drive the latter shaft.

Means are provided for transferring the bottles from the auxiliary conveyor to the main conveyor. As shown, in Figure 4 of the drawings, the bottles on the auxiliary conveyor are arranged in a vertical position.

The auxiliary conveyor is provided with side walls 19 to prevent displacement of the bottles. The end of the side wall on the side adjacent the main conveyor is inclined, as at 20, and extends over the main conveyor above the vertical partitioning members 12. The other side wall is provided with a section 21, connected to the main section 19 by means of a hinge 22 and extending over the base of the auxiliary conveyor. The hinged section of the side wall is yieldingly forced toward the main conveyor by means of springs 23, mounted on suitable rods or pins 24. As shown, these rods or pins are supported by standards 25. These standards are connected to a horizontal member 26 extending longitudinally of the auxiliary conveyor, and forming a support for the side wall 19. Standards 27 are connected to this member at spaced intervals to support the side wall. Beyond this point, the main conveyor is provided with means for lowering the bottles to a horizontal position before they pass through the washing tank. As shown, an arm 28 extends across the main conveyor, inclining downwardly and is adapted to engage the bottle adjacent its neck, as shown in Figure 4 of the drawings, and gradually lower it to a horizontal position. This arm is supported by a transverse arm 29, mounted on a post or support 30.

Within the tank the conveyor is provided with side walls 31 which are spaced from each other a distance equal to the height of the bottle. As the bottle is lowered to a horizontal position by the arm 28, the neck or mouth of the bottle engages the opposite side wall to prevent it from falling off the conveyor. As shown in Figure 6 of the drawings, plates 32 and 33 are arranged on these side walls to support the portion of the bottle projecting on each side of the conveyor. The plate 33, which is adapted to engage the neck of the bottle, is arranged at a higher elevation than the conveyor and the plate 32 is arranged substantially level with the conveyor. As shown (see Figure 3) the plate 33 may be provided with inclined portions 34 and vertical portions 35 which tend to give the bottle a rocking motion and assist in the washing.

After the bottles have passed through the washing tank they are adapted to be raised to a vertical position by means of a curved inclined plate 36. As shown, the last inclined portion 37 of the plate 33 rises to a greater elevation than the remaining inclined portions 34 to initially lift the neck of the bottle and assist it in engaging the guide. The plate 31 on the opposite side of the conveyor extends beyond the end of the tank and opposite the guide 36 it is curved inwardly as at 38 to a point adjacent the side of the conveyor. This forces the bottom of the bottle onto the conveyor as the neck is raised by the guide. After the bottles are delivered from the washing tank, they are adapted to pass through a chute 39 to a loading table 40. Suitable means are provided for unloading the bottles from the main conveyor. The unloading mechanism consists of a plate or disk 41 having a plurality of downwardly extending teeth or fingers 42. These teeth are adapted to mesh with the conveyor chain, as shown in Figure 5 of the drawings, to drive the unloader. As the teeth revolve, they enter the compartments in the conveyor chain and force the bottles laterally from the conveyor into the chute 39. The unloading device is yieldingly supported to permit it to give if a bottle should become caught in the apparatus. As shown, it is mounted on a plate 43, which is pivotally supported, as at 44. The opposite end of the plate is connected to a rod 45 by an arm 46 and this rod is in turn connected to a coil spring 47. A rod 48 is connected to the other end of the coil spring and the end of this rod is connected to a suitable stationary support 49.

In operation, the bottles are placed on the auxiliary conveyor 15 in a vertical position. The side walls 19 prevent the bottles from becoming displaced. As the bottles approach the point where they are to be delivered to the main conveyor, they engage the yielding side wall section 21 of the guide 19 and are forced laterally by it onto the main conveyor. This side wall is yieldingly supported and will give if the bottle engages one of the partition members 12 when passing onto the main conveyor. The inclined guide member 20 prevents the bottles from passing over the outer edge of the main conveyor when being delivered thereto. On the main conveyor, the bottles are arranged in the compartments formed by the vertical members 12. The arm 28 then engages the bottle adjacent the top and tips it over to a horizontal position. By extending this arm across the conveyor at an angle, and inclining it downwardly, it automatically lowers the bottle to a horizontal position before passing through the washing tank. The guide 36 then engages the bottle and as this guide extends in a reverse direction inclining upwardly and being arranged at an angle extending toward the conveyor, it again lifts the bottle to a vertical position. The teeth 42 of the unloading member enter the compartments in the conveyor chain and force the bottles laterally into the chute 39 which delivers them to the loading platform or table 40.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A conveyor comprising an endless chain, vertical partitions mounted on said chain to divide it into compartments, a chute arranged adjacent said conveyor, a disk arranged above said conveyor adjacent said chute, said disk being provided with spaced teeth adapted to mesh with the partitions of said conveyor chain to revolve said disk and force articles in said compartments onto said chute, and a loading platform arranged at the end of said chute.

2. The combination with a pair of conveyors arranged adjacent to and parallel to each other, of means for transferring articles from one of said conveyors to the other, said means comprising a pair of side walls arranged adjacent said first conveyor, the end of the side wall on the inside extending across said second conveyor, and a yieldingly mounted wall extending from the other side wall across said first conveyor to the adjacent side of said second conveyor 3. The combination with a pair of conveyors arranged adjacent to and parallel to each other, of means for transferring articles from one of said conveyors to the other, said means comprising a pair of side walls arranged on each side of said first conveyor, an inclined wall connected to the end of the inner wall and extending across said second conveyor, a hinged section secured to the end of the other wall and extending across said first conveyor, and springs engaging said hinged section to normally maintain it in a position substantially parallel to said inclined wall.

4. A conveyor comprising an endless chain, vertical partitions mounted on said chain to divide it into compartments, a disk arranged in a plane substantially parallel to the plane of movement of said conveyor, said disk being provided with spaced depending teeth adapted to mesh with the partitions of said conveyor chain to revolve said disk and force articles out of said compartments.

5. A conveyor comprising an endless chain, vertical partitions mounted on said chain to divide it into compartments, a disk arranged in a plane substantially parallel to the plane of movement of said conveyor, said disk being provided with spaced depending teeth adapted to mesh with said conveyor chain to revolve said disk, the said teeth arranged to move transversely through the compartments to force articles from the conveyor.

6. A conveyor comprising an endless chain and divided into compartments, a rotatably mounted disk provided with depending spaced teeth arranged to engage said conveyor and move transversely through the compartments to force articles from the conveyor.

In testimony whereof I affix my signature.

JOHN T. LEMON.